United States Patent [19]
Taylor

[11] Patent Number: 5,216,532
[45] Date of Patent: Jun. 1, 1993

[54] OPTICAL MULTIPLEXING

[75] Inventor: Robert M. Taylor, Cheltenham, England

[73] Assignee: Smiths Industries Public Limited Company, London, England

[21] Appl. No.: 578,796

[22] Filed: Sep. 7, 1990

[30] Foreign Application Priority Data

Sep. 21, 1989 [GB] United Kingdom ............... 8921341

[51] Int. Cl.⁵ .................... H04J 4/00; H04J 14/02; H04J 10/00
[52] U.S. Cl. ................................. 359/123; 359/143; 359/132; 359/162; 356/345
[58] Field of Search .............. 359/123, 127, 128, 132, 359/162, 189, 190, 191, 143; 370/95.1, 95.3, 50, 70, 122; 455/3, 67, 209; 250/227.19, 227.13, 227.27; 356/345

[56] References Cited

U.S. PATENT DOCUMENTS

| | | | |
|---|---|---|---|
| 4,302,835 | 11/1981 | McMahon | 359/182 |
| 4,467,468 | 8/1984 | Miller | 370/3 |
| 4,632,551 | 12/1986 | Paulath | 250/227.19 |
| 4,653,916 | 3/1987 | Henning et al. | 356/345 |
| 4,775,216 | 10/1988 | Layton | 250/227.12 |
| 4,777,661 | 10/1988 | Spillman, Jr. | 359/191 |
| 4,999,489 | 3/1991 | Huggins | 250/227.23 |

FOREIGN PATENT DOCUMENTS

| | | |
|---|---|---|
| 0033237 | 8/1981 | European Pat. Off. . |
| 0295857 | 12/1988 | European Pat. Off. . |
| 0318334 | 5/1989 | European Pat. Off. . |
| 0074833 | 3/1989 | Japan ............ 359/143 |

Primary Examiner—Edward L. Coles, Sr.
Assistant Examiner—Rafael Bacares
Attorney, Agent, or Firm—Pollock, Vande Sande and Priddy

[57] ABSTRACT

An optical multiplexing system has several optical sensors connected in parallel between a source and a detector, the path length between source and detector via each sensor being different. The source is modulated at a number of different frequencies, the number being equal to that of the sensors. The output of the detector is an electrical signal which is fed to one input of a number of mixers, one for each frequency. The other input of each mixer receives a different one of each of the frequencies so that each mixer produces an output representative of different ones of the sensors.

8 Claims, 3 Drawing Sheets

|  | TIME | | | |
|---|---|---|---|---|
|  | T1 | T2 | T3 | T4 |
| S1 | RF4 | RF1 | RF2 | RF3 |
| S2 | RF3 | RF4 | RF1 | RF2 |
| S3 | RF2 | RF3 | RF4 | RF1 |
| S4 | RF1 | RF2 | RF3 | RF4 |

SENSOR

OPTICAL MULTIPLEXING

BACKGROUND OF THE INVENTION

This invention relates to optical multiplexing systems and methods.

A system including several optical sensors or other devices can be multiplexed by time division multiplexing in which the path lengths between a source of optical radiation and a detector via each sensor are arranged to be different. In this way, a single short pulse of radiation injected by the source into the system, will result in a series of pulses at the detector spaced from each other in time by an amount according to the difference in path lengths via each sensor. The particular sensor associated with each return pulse can be identified by its location in the series of return pulses so that the outputs of the different sensors can be distinguished from one another.

One difficulty with this arrangement is that of ensuring that the pulses do not overlap at the output. To ensure that the output pulses associated with the same input pulse do not overlap, the input pulses must be made sufficiently short and the difference in the time delays between each sensor must be sufficiently long. In order to ensure that the earlier output pulses produced with one input pulse do not overlap with the later output pulses produced by a preceding input pulse, the input pulse repetition rate must be kept low. The maximum pulse repetition rate will be inversely proportional to the number of sensors. The shortening of the input pulses and the limitation on repetition rate has a severe effect on the power budget of the system and, therefore, on the signal-to-noise ratio at the detector.

BRIEF SUMMARY OF THE INVENTION

It is an object of the present invention to provide an optical multiplexing system and method that can be used to reduce these difficulties.

According to one aspect of the present invention there is provided an optical multiplexing system including a plurality of optical devices connected between a source of optical radiation and a demodulator, the optical path length between the source and the demodulator via each device being different, means for modulating the output of the source at a plurality of different frequencies at different times in succession, the number of different frequencies being equal to the number of optical devices, the demodulator including a plurality of mixing means, the number of mixing means being equal to the number of optical devices, and at any time each mixing means being supplied at one input with a different one of the different frequencies and at another input with a sample of the outputs of all the optical devices.

The optical devices preferably includes an optical sensor. The system preferably includes a detector arranged to receive the outputs from the optical devices and to provide an electrical output in accordance therewith, each mixing means being supplied at the one input with an electrical signal at a different one of the different frequencies and at the other input with a sample of the output of the detector.

Alternatively, the system may include an individual oscillator for each of the plurality of different frequencies, the output of one of the oscillators being connected to the source and to one input of one of the mixing means, the output of each of the other oscillators being connected to respective ones of others of the mixing means, the frequency output of each oscillator being changed successively in time between the plurality of different frequencies such that at any time the output of each oscillator is at a different frequency. Each oscillator is preferably a voltage controlled oscillator the output frequency of which is dependent on the level of an input voltage. The system preferably includes a counter, a plurality of adders, each adder being connected between the counter and the input of a respective oscillator, and means for increasing the count provided by the counter to all but one of the adders so that the output of each adder at any time is at a different voltage level and so that the output of each oscillator is at a different frequency.

Alternatively, the means for modulating the source may include an oscillator arranged to provide an output that changes successively between the plurality of different frequencies, the output of the oscillator being supplied both to the source and to the one input of each mixing means, and the system including delay means between the oscillator and each mixing means such that at any time, the one input of each mixing means is supplied with a different frequency.

According to another aspect of the present invention there is provided a method of multiplexing an optical system including a plurality of optical devices connected between a source of optical radiation and a detector, the optical path length between the source and detector via each device being different, the output of the source being modulated at a number of different frequencies at different times in succession, the number of different frequencies being equal to the number of optical devices, such that the output of the detector at any one time includes a plurality of signals modulated at different frequencies.

Optical multiplexing systems and methods of multiplexing, in accordance with the present invention, will now be described, by way of example, with the reference to the accompanying drawings.

DETAILED DESCRIPTION OF THE PREFERRED EMBODIMENTS

Figures 1, 3:
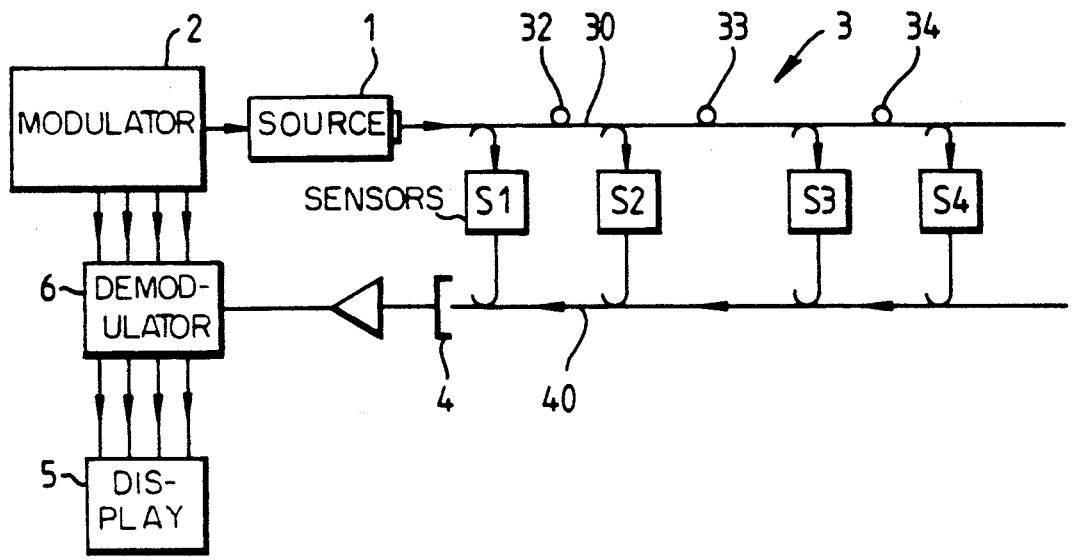
FIG. 1 shows an optical multiplexing system schematically.
FIG. 3 is a table illustrating operation of the system.

With reference to FIG. 1, the system includes a source 1 of optical radiation which is driven by a supply or modulator 2 to supply optical radiation to a ladder network 3. The ladder network 3 comprises an input bus 30 which extends to the source 1, an output bus 40, and four conventional sensors S1 to S4 connected in parallel between the input and output buses at different points along their length. The output bus 40 extends to a detector 4 which provides an electrical output to a display 5 or other utilization device via a demodulator 6. The input bus 30 includes a time delay 32, 33 and 34 between successive sensors S1 and S2, S2 and S3, and S3 and S4 so that a different time is taken by radiation to pass from the source 1 to the detector 4 via each sensor. It will be appreciated that a time delay will also be caused by the distance the radiation has to travel along the input and output buses 30 and 40, the rungs of the network, and the sensors S1 to S4 themselves.

Figure 2:
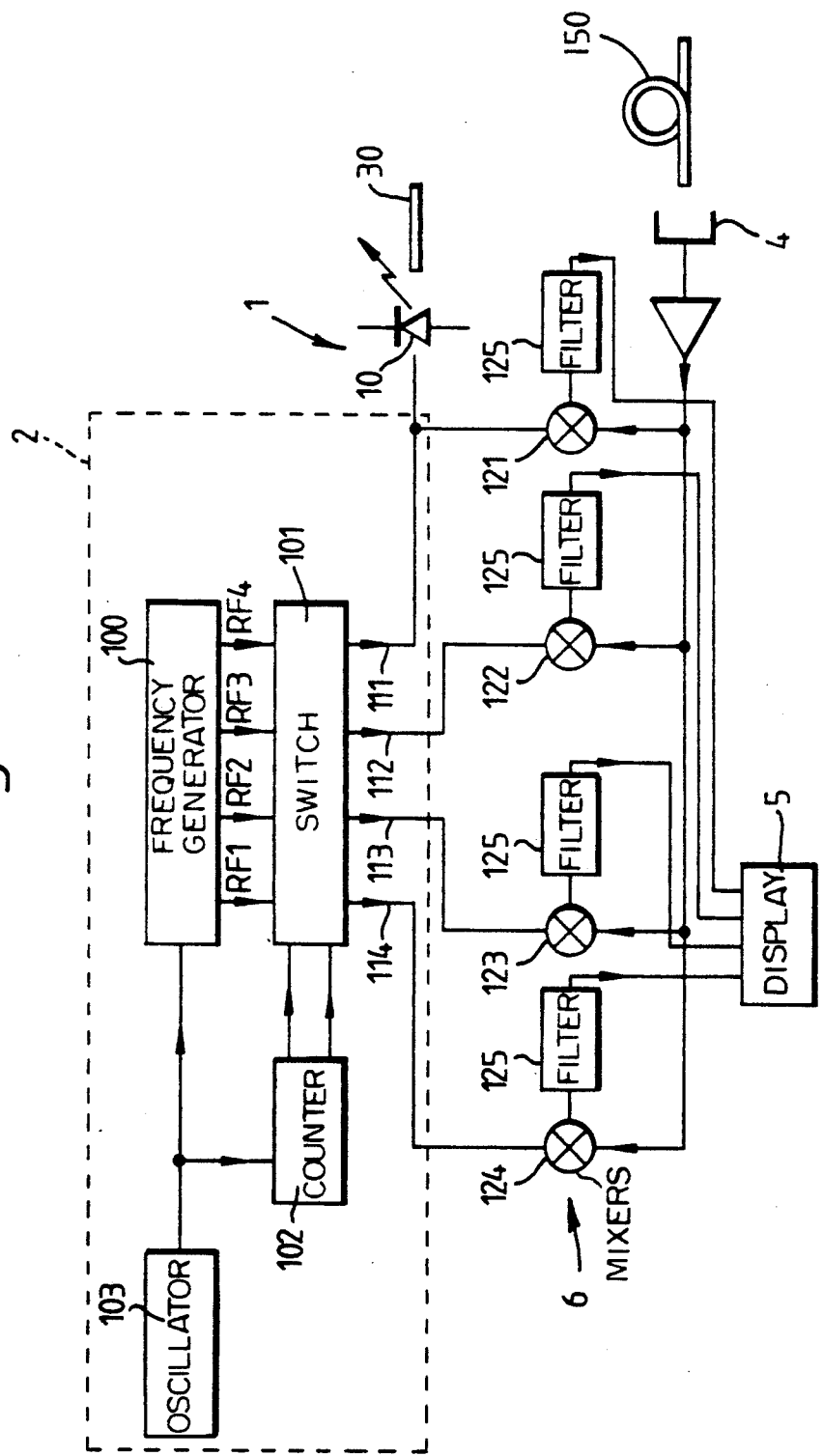
FIG. 2 shows a part of the system of FIG. 1 in greater detail.

With reference now also to FIG. 2, the source 1 includes a light-emitting diode (LED) 10 which is modulated successively at one of four different frequencies RF1 to RF4 which are produced continuously on the four outputs of a frequency generator 100 within the supply 2. The supply 2 also includes a switch 101 which is controlled by a 2-bit counter 102 that is connected to a clock oscillator 103 which drives the frequency generator 100. The switch 101 has four outputs 111 to 114 which at any time are connected to different ones of the four different frequencies RF1 to RF4 produced by the generator 100. The output on one line 111 is supplied to drive the LED 10 so that it is modulated at successively different frequencies RF1, RF2, RF3, RF4, RF1, RF2 and so on. The LED 10 supplies this modulated radiation to the input bus 30 so that it is supplied to all four sensors S1 to S4 and accordingly, each sensor will provide an output at the same frequency as is supplied to it. Because of the different time delays between each sensor S1 to S4, their outputs will overlap, and the output supplied to the detector 4 at any one time will not be one frequency but will be a mixture of the four frequencies. For example, with reference to FIG. 3, the output at time T1 from sensor S1 might be a frequency RF4 whereas the output from sensor S2 is at RF3, the output from sensor S3 is at RF2, and that from sensor S4 is at RF1.

The output on line 111 from the switch 101 is also supplied to one input of a mixer 121 the other input of which is connected to receive a sample of an amplified output from the detector 4. Similarly, the outputs on lines 112 to 114 are supplied to one input of respective mixers 122 to 124 which also receive at their second input the output of the detector 4. The frequency supplied from the switch 101 to one input of each mixer 121 to 124 will, therefore, change in time from RF1 to RF4. The frequency of the signal supplied to the other input of the mixers 121 to 124 at any time will always be a mixture of the four different frequencies RF1 to RF4. Each mixer 121 to 124 will thereby produce an output in the form of a d.c. signal representative of the amplitude of the detector signal at the frequency supplied to its first input. An optical delay at 150 may be used to synchronize the sensor outputs with the switch 101. The outputs of the mixers are supplied via respective low-pass filters 125 to provide four different outputs to the display 5 representative of the operation of each respective sensor.

Figure 4:
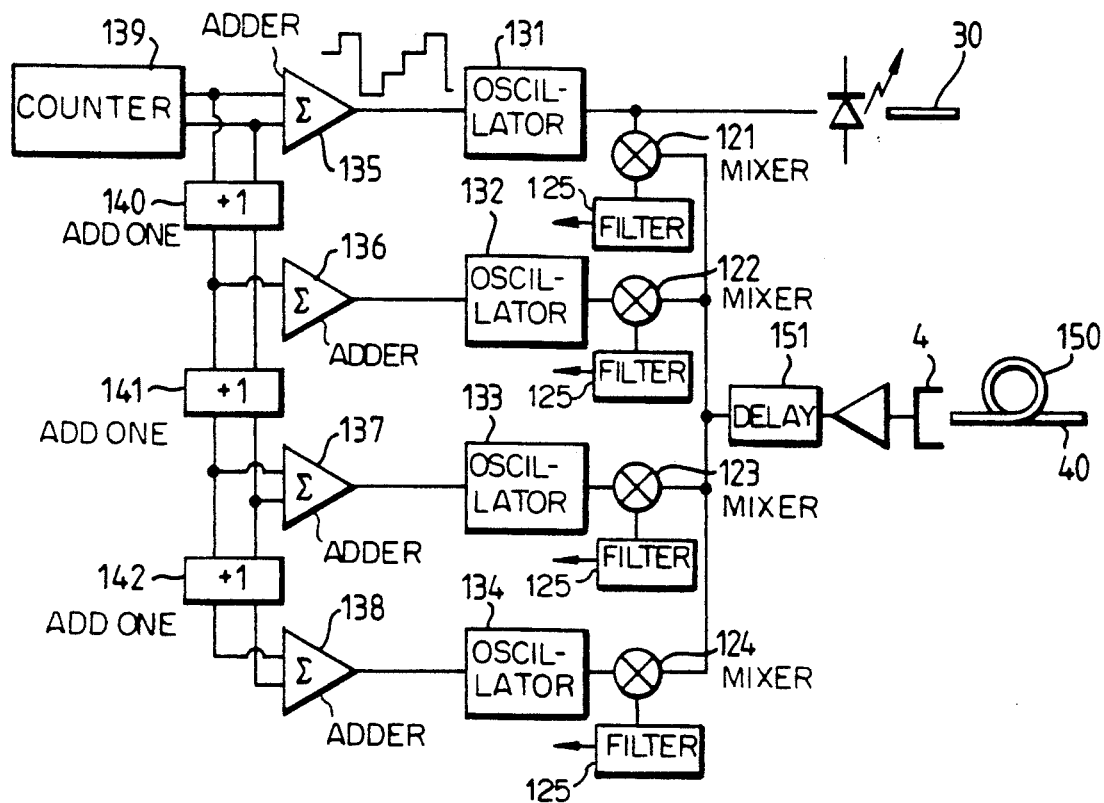
FIGS. 4 and 5 show different modifications of the system of FIGS. 1 and 2.

The arrangement shown in FIG. 4, is similar to that described with reference to FIG. 3, in that it employs four mixers 121 to 124 which each mix a sample of the output of the detector 4 with input signals at different, changing frequencies. In the arrangement of FIG. 4, however, the signal supplied to the first input of each mixer is derived from respective, different voltage controlled oscillators 131 to 134. Each oscillator 131 to 134 is driven by a step voltage input derived from a diffent adder 135 to 138. A counter 139 provides a direct input to the first adder 135 but each input to the other adders 136 to 138 is increased by respective devices 140 to 142 which each add one to the value of the output of the counter. In this way, the output of the adder 136 is one greater than that of adder 135, whereas the output of adder 137 is two greater than that of adder 135 and so on. This causes the step voltages applied to the input of each of the oscillators 131 to 134 to be out of phase with each other by one step, so that the frequency applied to the first input of each mixer 121 to 124 differs from one another at any time. In this arrangement, an optical delay 150 may be included in the output bus 40 or an electronic delay 151 connected after the detector 4 so as to bring the output from the sensors into synchronism with the output of the oscillators 131 to 134.

Figure 5:
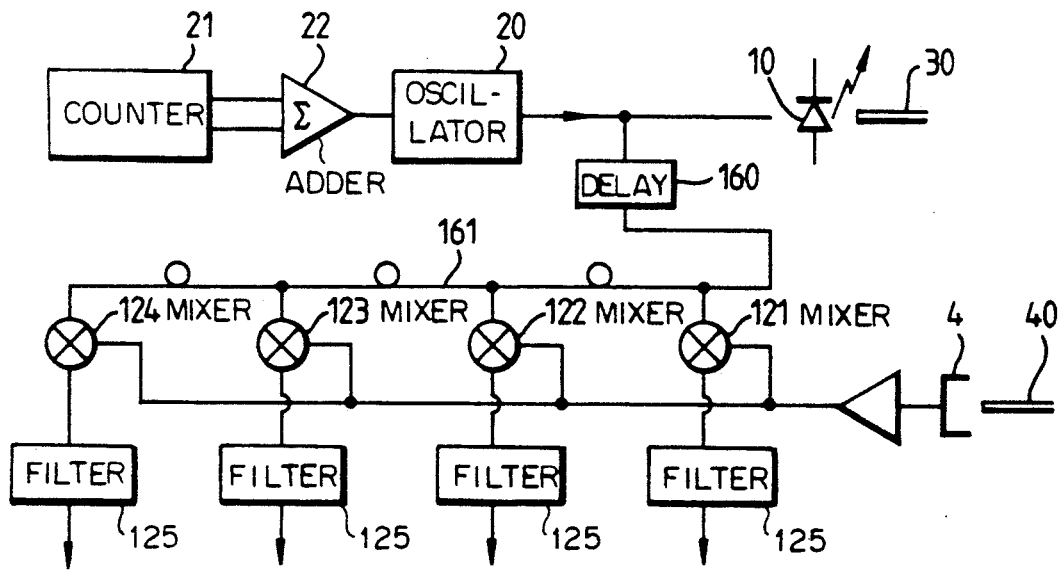

In a further modification, shown in FIG. 5, a single voltage-controlled oscillator 20 provides a drive signal to the LED 10 at a frequency dictated by the voltage at its input. The input to the oscillator 20 is of step form, being derived from a two-bit counter 21 and adder 22 to give four different voltage levels. The output of the oscillator 20 thereby changes successively in steps and is supplied to drive the LED 10. A sample of the electrical output of the oscillator 20 is supplied via a delay 160 to a delay line 161. The first inputs to four mixers 121 to 124 are tapped off the delay line 161 at four different points, the delay between each tapping being equal to the time interval for each of the different frequencies at the output of the oscillator 20. The frequency of the signal supplied to the first input of each mixer thereby differs one from the other and changes in synchronism with the signal supplied to the input bus 30.

Instead of converting the optical signals to electrical signals and using electrical mixers, optical mixers could be used.

What is claimed is:

1. An optical multiplexing system comprising: a source of optical radiation; a demodulator; a plurality of optical devices, each said device being connected between the source and the demodulator, the optical path length between the source and demodulator via each device being different; and a modulator, the modulator including a frequency generator having a plurality of outputs and producing continuously at respective ones of the outputs individual ones of a plurality of different frequencies, the number of different frequencies being equal to the number of optical devices, the demodulator including a plurality of mixers, each mixer having two inputs, the number of mixers being equal to the number of optical devices, the system including a switch that connects respective outputs of the frequency generator both to the source and to respective ones of the mixers, the switch being operative to switch respective outputs of the frequency generator to the source and to the mixers at different times in succession such that at any time the system supplies each mixer at one input with a different one of the different frequencies and at the other input with a sample of the outputs of all the optical devices such that each mixer provides an output representative of the output of a respective one of the optical devices.

2. An optical multiplexing system according to claim 1, wherein the optical devices include an optical sensor.

3. An optical multiplexing system according to claim 1, including a detector, means connecting the detector to receive the outputs from the optical devices and to provide an electrical output in accordance therewith, and wherein the system supplies each mixer at said one input with an electrical signal at a different one of the different frequencies and at said other input with a sample of the output of the detector.

4. An optical multiplexing system according to claim 1, wherein the modulator includes an oscillator having an output connected both to drive the frequency generator and to a counter, and wherein the counter is connected to the switch to control switching of the switch.

5. An optical multiplexing system according to claim 1, wherein each oscillator is a voltage controlled oscillator the output frequency of which is dependent on the level of an input voltage.

6. An optical multiplexing system according to claim 5, wherein the system includes a counter, a plurality of adders, each adder being connected between the counter and the input of a respective one of said oscillators, and means for increasing the count provided by the counter to all but one of said adders so that the output of adder at any time is at a different voltage level and so that the output of each oscillator is at a different frequency.

7. An optical multiplexing system comprising a source of optical radiation; a demodulator; a plurality of optical devices, each said optical device being connected between the source and the demodulator, the optical path length between the source and demodulator via each device being different; a plurality of oscillators equal in number to the optical devices, each oscillator providing an output at a different frequency, the demodulator including a plurality of mixers, each mixer having two inputs, the number of mixers being equal to the number of optical devices, the output of one of the oscillators being connected to the source and to one of the inputs of one of the mixers, the output of each of the other oscillators being connected to one input of respective ones of others of the mixers, the frequency output of each oscillator changing successively in time between the plurality of different frequencies such that at any time the outputs of the oscillators are at frequencies that differ from one another, and means supplying the other input of each mixer with a sample of the outputs of all the optical devices such that each mixer provides an output representative of the output of a respective one of the optical devices.

8. An optical multiplexing system comprising: a source of optical radiation; a demodulator; a plurality of optical devices, each said optical device being connected between the source and the demodulator, the optical path length between the source and demodulator via each device being different; oscillator means providing an output that changes successively between a plurality of different frequencies, the demodulator including a plurality of mixers, each mixer having two inputs, the number of mixers being equal to the number of optical devices, the output of said oscillator means being connected to said source and to one of the inputs of one of the mixers, delay means connected between said oscillator means and each said mixer such that at any time said one input of each mixer receives a different frequency, and means supplying the other input of each mixer with a sample of the outputs of all the optical devices such that each mixer provides an output representative of the output of a respective one of the optical devices.

* * * * *